(12) United States Patent
Davis et al.

(10) Patent No.: US 7,296,117 B2
(45) Date of Patent: *Nov. 13, 2007

(54) METHOD AND APPARATUS FOR AGGREGATING STORAGE DEVICES

(75) Inventors: Mark Charles Davis, Durham, NC (US); Richard Victor Kisley, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 226 days.

This patent is subject to a terminal disclaimer.

(21) Appl. No.: 10/777,531

(22) Filed: Feb. 12, 2004

(65) Prior Publication Data

US 2005/0182889 A1    Aug. 18, 2005

(51) Int. Cl.
*G06F 12/00* (2006.01)

(52) U.S. Cl. .................................... 711/114

(58) Field of Classification Search ............... 711/4, 711/114; 710/37; 714/7; 361/685
See application file for complete search history.

(56) References Cited

U.S. PATENT DOCUMENTS

| | | | |
|---|---|---|---|
| 4,811,275 A | 3/1989 | Balogh, Jr. et al. | |
| 5,367,669 A * | 11/1994 | Holland et al. ................ | 714/7 |
| 5,398,158 A | 3/1995 | Fisher et al. | |
| 5,423,046 A | 6/1995 | Nunnelley et al. | |
| 5,455,934 A * | 10/1995 | Holland et al. ................ | 711/4 |
| 5,687,089 A | 11/1997 | Deyesso | |
| 5,768,623 A * | 6/1998 | Judd et al. ..................... | 710/37 |
| 5,777,845 A * | 7/1998 | Krum et al. ................. | 361/685 |
| 5,895,493 A | 4/1999 | Gatica | |
| 5,974,503 A | 10/1999 | Venkatesh et al. | |
| 6,112,276 A | 8/2000 | Hunt et al. | |
| 6,301,640 B2 | 10/2001 | Barve et al. | |
| 6,483,660 B1 | 11/2002 | Akagi et al. | |

FOREIGN PATENT DOCUMENTS

| | | |
|---|---|---|
| EP | 0 125 920 | 11/1984 |
| EP | 0560529 A2 | 9/1993 |
| GB | 2266615 A | 11/1993 |
| JP | 11282636 A | 2/2001 |
| JP | 2002073393 A | 3/2002 |
| WO | WO9718553 A1 | 5/1997 |

OTHER PUBLICATIONS

IBM Technical Disclosure Bulletin, vol. 37, No. 12, Dec. 1994, pp. 525-527.

* cited by examiner

*Primary Examiner*—Pierre Bataille
*Assistant Examiner*—Paul Schlie
(74) *Attorney, Agent, or Firm*—David W. Lynch; Chambliss Bahner & Stophel PC

(57) ABSTRACT

A method and apparatus for aggregating storage devices is disclosed. A package for providing high density storage uses a carrier housing for holding multiple storage devices proximate to one another and aligned in a row, and an access device, coupled to the carrier housing, aggregates the physical addresses of the storage devices into logical addresses and making the logical addresses available over a connection.

8 Claims, 7 Drawing Sheets

METHOD AND APPARATUS FOR AGGREGATING STORAGE DEVICES

CROSS-REFERENCE TO RELATED APPLICATIONS

This application is related to the following co-pending and commonly-assigned patent application, which is hereby incorporated herein by reference in its respective entirety: "METHOD AND APPARATUS FOR PROVIDING HIGH DENSITY STORAGE" to Davis et al., Ser. No. 10/777,529.

BACKGROUND OF THE INVENTION

1. Field of the Invention

This invention relates in general to storage devices and more particularly to a method and apparatus for aggregating storage devices.

2. Description of the Prior Art

Information is rapidly becoming the most valuable asset of most companies. At the same time, managing and protecting information is becoming dramatically more complex and difficult due to the explosion in data storage requirements and the shift from centralized to distributed storage of data on enterprise networks. In addition, users are storing more and more data on their desktop and laptop computers. The exploding storage requirements are continually outgrowing the storage capacity of servers and workstations. As a result, storage capacity must be continually updated, which is costly and disruptive to users.

Magnetic storage is a popular means of storage because stored data persists even without a continual source of electricity, and because this type of data storage is affordable for many applications. Magnetic storage is frequently implemented on a more massive scale. For example, some storage systems aggregate a large number of storage devices into a single storage system within a single enclosure, utilizing control electronics, power supplies, cooling features, and other infrastructure that is common to all drives in the system. Further, such storage devices may encounter performance constraints. For example, such performance constraints may be related to server processing speeds, hard disk drive (HD) access rates, limitations on areal density of the storage media and the storage networking link speed. Historical solutions to these problems included shrinking HD platter sizes to allow greater spindle speeds, although this solution is reaching the level of diminishing returns, and grouping HDs using redundant arrays of inexpensive disks (RAIDs), and other technologies to place segments of sequentially addressed data at similar places on multiple HD platters, and on multiple HDs (using RAID striping).

Currently, hard disk array enclosures in the area of enterprise-class disk array architecture are dominated by 3.5-inch form factor drives, stacked on their sides in a row of 10-15 HDs. Each HD is housed in a carrier (HDC), which protects the drive during normal handling and allows guided insertion of the HD into a storage system, allowing the rear connectors to link up properly to the storage system. Today, HDCs each hold 1 HD and are housed in a storage system having power aggregation, heat dissipation aggregation and storage network connection sharing. In a storage system multiple power supplies (usually 2) are aggregated and made available to each HDC and to the electronics of the storage system. Heat is dissipated from the storage system by arranging HDs in a larger storage system, 3U high (1U=1.75 inches) by 19 inches wide, so that large fans can be placed at the rear of the storage system to allow cooling of the HDs. Storage systems use storage network connection sharing because each HD can only access data at a fraction of the potential bandwidth of the connection to the storage network. Therefore, HDs are placed on a network internal to the storage system. The storage system has a small number of connections, typically two, to the storage network. Although both connections are used for performance, one is essentially a backup in case the other one has a link failure. Typically, HDs are addressable through the storage system connections, although some storage systems enhance the enclosure electronics to provide Redundant Arrays of Inexpensive Disks (RAID). This offers logical disks through the storage system connections that are internally mapped to the physical disks.

Aggregating HDCs does not overcome the previously mentioned performance problems of server processing speeds, areal density of HD storage media and storage networking link speed. In attempting to solve these problems, attention must be paid to cost per gigabyte in implementing solutions. HDs offer "x" gigabytes of storage in a finite amount of space, for a finite amount of power, with a finite complexity of connection, and as a result cost per gigabyte is impacted by the challenges of space utilization, power needs and heat dissipation, and electrical connection.

Space utilization affects cost per gigabyte because designing and implementing the DE incurs cost. Where currently available DEs are used, design and implementation costs may be eliminated thereby eliminating the space utilization factor related to DE design and implementation in calculating cost per gigabyte. Further, when extra space is needed to house additional storage, cost per gigabyte is affected. However, if the same amount of space can be used to store a greater amount of storage, then space utilization cost per gigabyte is reduced.

HDs require an amount of power to operate. With an increasing amount of power used in a space, there is an increased amount of heat generated in that space, both affecting cost. HDs generally need to run continuously because an idle HD has a higher probability of failure proportional to idle time. As a result of the necessity for HDs to be continuously active, heat is continuously generated. But, excessive heat destroys electronic media and reduces the reliability of managing electronics. Thus, the amount of power used by the HD directly incurs cost, and compensating for heat generation, by implementing cooling fans for example, incurs cost by its use of power and increase in design complexity. Each of these factors directly increases cost per gigabyte for the storage system.

Electrical connections like parallel ATA and parallel SCSI HD connections involve 40+ pins per HD. Fibre Channel uses fewer pins but has its own connectivity challenges and cannot be implemented at a low cost. The complexity of the electrical connectivity directly impacts cost per gigabyte by increasing the design/implementation cost of the storage system.

It can be seen that there is a need for a cost effective method and apparatus for aggregating storage devices.

SUMMARY OF THE INVENTION

To overcome the limitations in the prior art described above, and to overcome other limitations that will become apparent upon reading and understanding the present specification, the present invention discloses a method and apparatus for aggregating storage devices.

The present invention solves the above-described problems by aggregating storage devices in a package using an address aggregator. The package is inserted into a storage system designed to aggregate and house multiple packages.

A package for providing high density storage in accordance with the principles of the present invention includes a carrier housing for holding multiple storage devices proximate to one another and aligned in a row and an access device, coupled to the carrier housing, for structuring access to physical addresses of the multiple storage devices and providing access to each of the multiple storage devices over one connection.

In another embodiment of the present invention, a package for aggregating electronic devices is provided. The package includes means for holding multiple storage devices proximate to one another and aligned in a row and means, coupled to the means for holding, for structuring access to physical addresses of the multiple storage devices and providing access to each of the multiple storage devices over one connection.

In another embodiment of the present invention, an access device is provided. The access device includes memory for storing data therein and a processor, coupled to the memory, the processing being configured for structuring access to physical addresses of the multiple storage devices and providing access to each of the multiple storage devices over one connection.

In another embodiment of the present invention, a storage system is provided. The storage system includes a plurality of packages for providing high density storage, each package comprising a carrier housing for holding multiple storage devices proximate to one another and aligned in a row and an access device, coupled to the carrier housing, for structuring access to physical addresses of the multiple storage devices and providing access to each of the multiple storage devices over one connection, an enclosure for holding the plurality of the packages for providing high-density storage, a package aggregator, coupled to the plurality of packages for providing high density storage, the package aggregator providing connections to each of the plurality of packages for power, control and signaling and a system level controller, coupled to the plurality of packages, for implementing a desired storage system configuration.

In another embodiment of the present invention, a method for providing high-density storage is provided. The method includes holding multiple storage devices proximate to one another and aligned in a row and providing structured access to physical addresses of the multiple storage devices over one connection.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and apparatus for providing a package for housing multiple storage devices (SDs) to allow greater SD aggregation in a storage system of a predetermined size. The package houses an address aggregator to aggregate the physical addresses of each SD allowing for an increased total number of SDs to be housed in a package and in a storage system. This allows for a reduced overall cost per gigabyte for each storage system. Components of the address aggregator include: space to attach a cable for each SD in the package, address processor and memory. In one embodiment of the present invention, system level RAID and package level RAID are provided.

Figure 1:
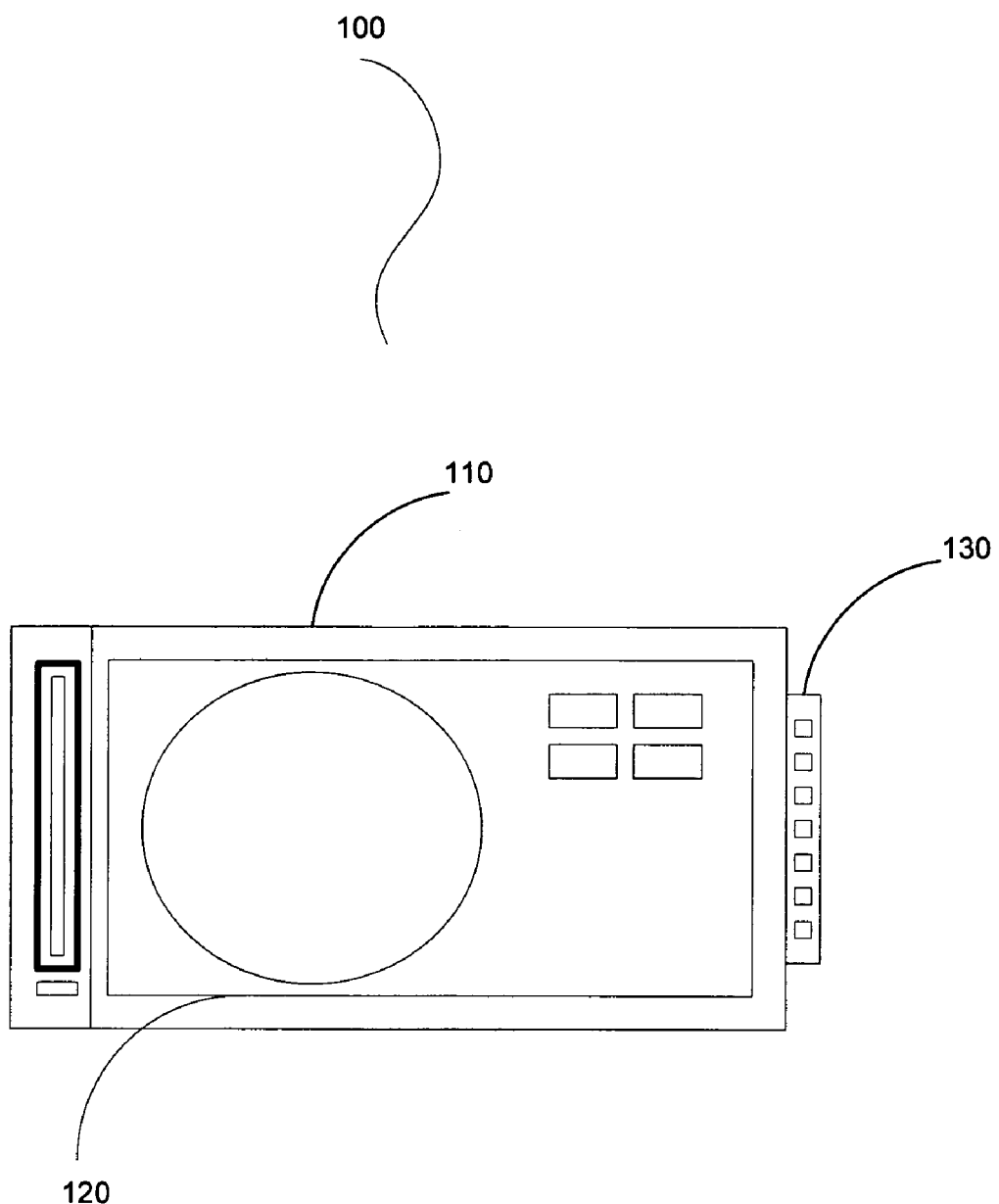
FIG. 1 is a view of a single hard disk drive (HD) carrier having a casing, HD and external connector in accordance with an embodiment of the present invention.

FIG. 1 is a view of a single hard disk drive (HD) carrier 100 having casing 110, HD 120 and external connector 130. External connector 130 protrudes from the casing 110 allowing the HD carrier 100 to be connected to external devices such as a disk enclosure (DE) (not shown).

Figure 2:
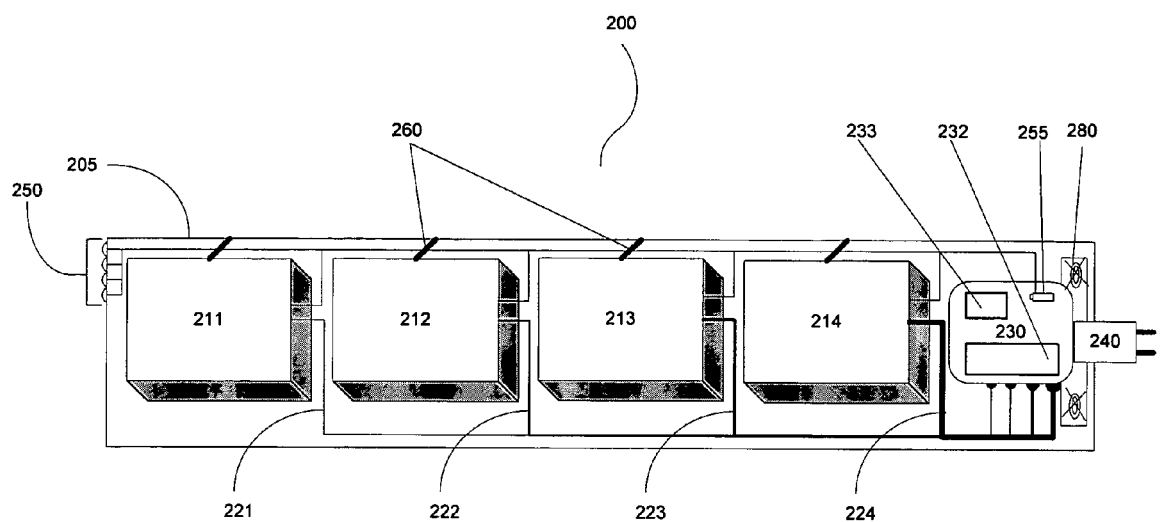
FIG. 2 illustrates a package having a carrier housing four horizontally situated storage devices in accordance with an embodiment of the present invention.

FIG. 2 illustrates a package 200 having a carrier housing 205 four horizontally situated storage devices 211-213 in accordance with an embodiment of the present invention. In FIG. 2, carrier housing SD connectors 221, 222, 223 and 224, access device 230 and external connector 240 are also illustrated. Package 200 houses four SDs 211-214 having horizontal placement in carrier housing 205. SDs 211-214 are each connected to access device 230 via carrier housing SD connectors 221-224. Access device 230 includes a processor 232 and memory 233 for aggregating the physical addresses of the SDs 211-214 over the internal physical connections 221-224. The access device 230 may also map the addresses of the physical SDs 211-214 into logical addresses and make the logical addresses available over a connection 240.

Package 200, in accordance with the present invention, may include several configurations. For example, package 200 may be configured for the replacement of a single SD upon SD failure by pulling the package from the storage system and swapping the failed SD with a new SD. The package may be fitted with failure/activity indication lights 250, one for each SD 211-214 for easily determining whether a SD is faulty. Such lights may be battery-powered 255. The package may be designed to allow partial population, where not all of the available SD spaces are used. The package may be further designed to include cooling fans 280 for SD heat dissipation. Another embodiment of the present invention includes mounting spring-loaded brackets 260 in the package to hold each SD in place. This ensures the stability of the package during handling and reduces stress on the SD connectors. Brackets may be mounted from the top of the package and swing down over the SD, locking in place after SD insertion. Alternatively, the bracket could be part of the structural housing that protects the connectors at the rear of each SD position in the package allowing the bracket to swing laterally over against the SD after insertion and lock in place.

A myriad of storage devices 211-214 with varying storage capacities can be used in embodiments of the present invention. For example, 2.5-inch form factor serial ATA or serial SCSI disk drives may be used. Another example SD that may be used is the larger 3.5-inch form factor SD. Storage capacities of each of the above-described SDs vary. With continuous advancements in technology, the amount of storage available for 2.5-inch form factor serial ATAs, for example, is increasing and is currently available with a 120 gigabyte storage capacity. However, the present invention is not meant to be limited to any particular form factor, storage capacity number of SDs in a carrier, the orientation of the SDs or of any other storage device characteristic.

Access device 230 makes the logical addresses available to, for example, external devices (not shown) via external connector 240. This allows external devices, such as electronic devices contained in the storage system, to receive information from each package. For example, electronic devices such as RAID controllers in the storage system can communicate with each package via access device 230 allowing system level RAID. Other advantages to implementing an access device 230 in a package 200 includes reduced external connectors per SD 211-214 and reduced housing space per SD 211-214 because multiples SDs 211-214 can be housed in one package. This reduction in space allows for an increased amount of SD space available, thereby increasing the amount of memory available per storage system and reducing cost per gigabyte.

Connecting SDs 211-214 to access device 230 is accomplished using carrier housing SD connectors 221-224. Several types of connectors may be used to connect SDs 211-214 to access device 230 including: serial advanced technology attachment (SATA) hard drive interconnects, SATA-2 interconnects, serial attached SCSI (SAS) technology, and arbitrated loop or switched Fibre Channel (FC). SATA cables are thinner than parallel ATA and use a 7-pin data connector instead of a 40-pin data connector. SATA cables use low-voltage differential signaling, consistent with low power and cooling requirements. Using interconnects satisfying the SATA-2 standard in embodiments of the present invention increases functionality and offers the 7-pin data connector per SD, as well as a lower power solution. SAS technology may be advantageous when used in implementations of the present invention because, assuming SAS can use the same connector cables and requirements as SATA, the benefits of SATA can be gained while also using the richness and reliability/serviceability of the SCSI command set. FC SDs have different power and lower pinout requirements giving FC SDs an advantage over SCSI or parallel ATA SDs. FC can be used in implementations of the present invention and are lightweight, durable and easy to implement within the package. FC also has high-speed data transfer properties over long distance and is only slightly affected by electrical noise and environmental factors.

The access device 230 connects to external connector 240. External connectors are used to connect to the storage system. Each package can have multiple external connectors 240. For example, two external connectors 240 may be provided for each package (not shown). The redundancy can be used as a failure mode back-up when the first external package connector fails. In the case of connector failure, the access device 230 may route traffic through both external connectors, detect and disable the failing connector 240 and continue operation through the remaining connector 240. Access device 230 can optionally offer failure mode data for problem diagnosis by management software or by connection and management electronics in the storage system.

Figure 3:
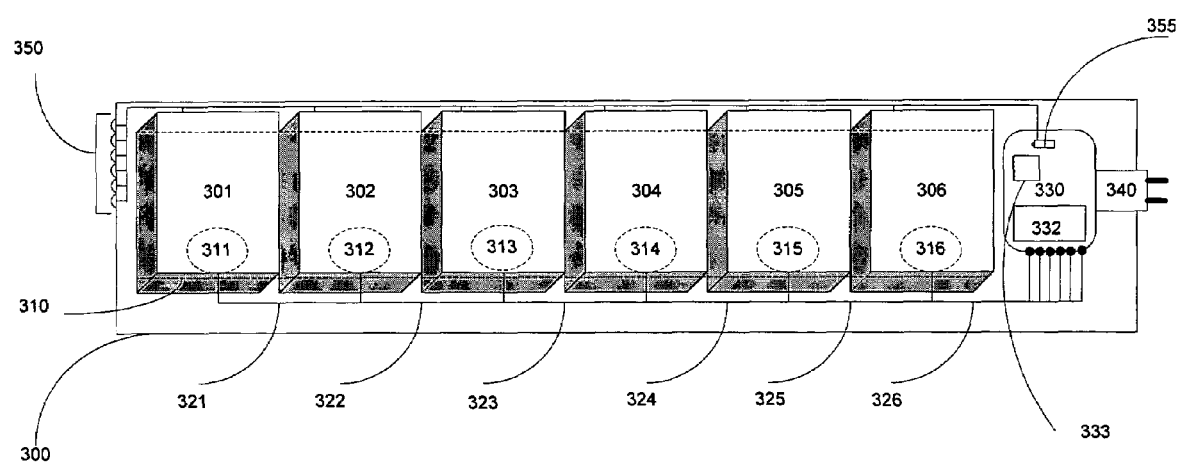
FIG. 3 illustrates a package having a carrier housing six vertically situated storage devices in accordance with an embodiment of the present invention.

FIG. 3 illustrates a package 300 having a carrier housing six vertically situated storage devices 301-306 in accordance with an embodiment of the present invention. Each of the six SDs 301-306 is inserted laterally carrier housing 300 oriented vertically and situated side-by-side. Each SD 301-306 is connected to carrier chassis 310 via in-line connections 311, 312, 313, 314, 315 and 316, respectively. In-line connections 321-326 connect to access device 330 via signal paths 321-326 where information is received and generated. SDs 301-306 receive information from external sources via connection 340 according to access device 330. External connectors 340 are designed to connect to the storage system. Address aggregator 330 includes a processor 332 and a memory 333 for virtualizing logical addresses of the multiple SDs 311-316 as at least one aggregate volume to provide a layer of abstraction to the SDs 311-316. Additionally, the package may incorporate failure indications lights 350, one for each SD 301-306, and may be battery powered from a small battery 355 inside the address aggregator. Advantages to vertically situated SDs in a package include allowing for a large air channel to flow from front to back of the package across the body of the drives to allow cooling, aggregating the connections by using guided cables, integrated board or wired backplane is easier because the example connectors and cables may rest at the bottom of the package, and light path diagnostics to the front of the package from each SD are easier to perform because all come out at the top of the package.

FIGS. 2-3 show only one type of SD insertion method. Other insertion methods include, for example, angular insertion methods and cable mounted package SD connectors. Angular insertion methods allow SD connectors to be tilted, swiveled or on a flexible medium. The SD may be slid into the connector at an angle, and then guided laterally onto the carrier housing, the motion straightening the angle of the carrier housing SD connector. Cable mounted carrier housing SD connectors mounted on flexible cable would allow the cable to be bent out to allow the SD to be attached. The attached SD could then be oriented in the carrier housing so that the SD connector cable is replaced in its original position.

Figure 4:
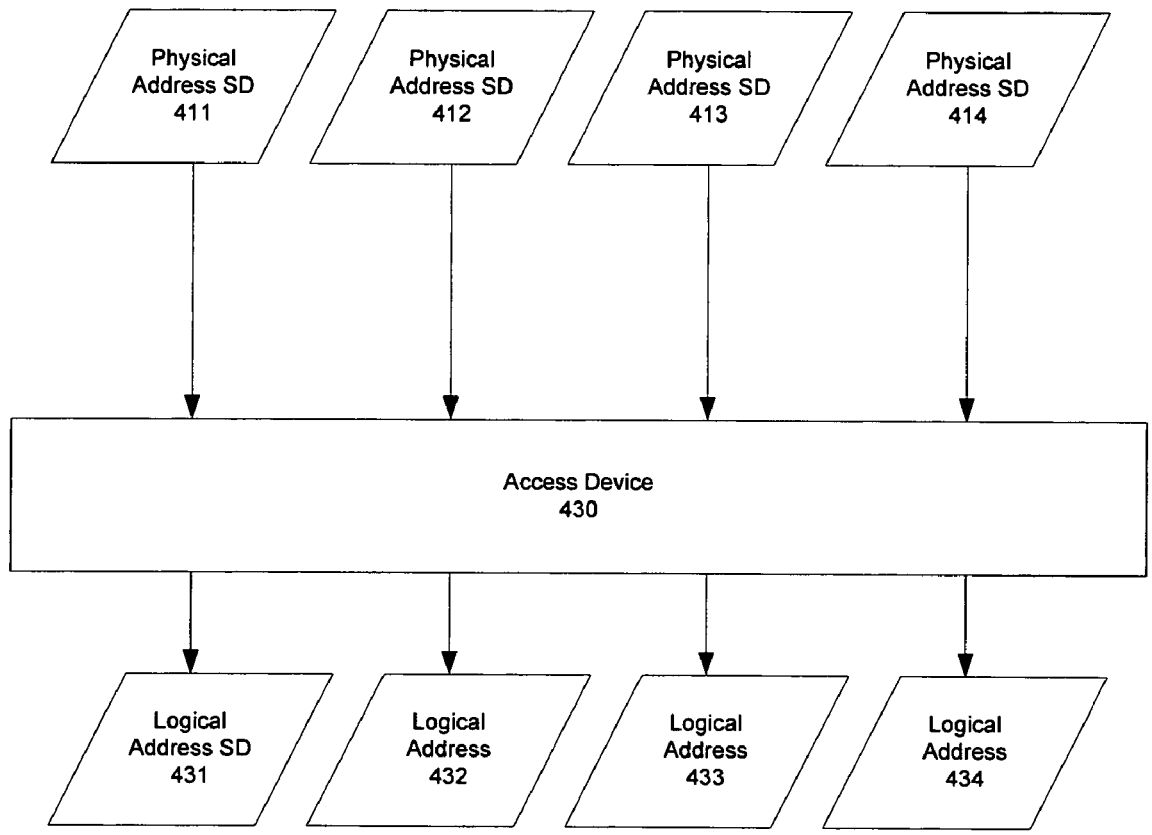
FIG. 4 is a flow chart of a method for address aggregation in accordance with an embodiment of the present invention.

FIG. 4 is a flow chart of a method for accessing storage devices in a package in accordance with an embodiment of the present invention. In FIG. 4, the access device 430 aggregates physical addresses 411-414 of storage devices over internal physical connections. The access device 430 also maps the physical addresses 411-414 of storage devices into logical addresses 431-434 and makes the logical addresses 431-434 available. The storage devices 411-414 may be accessed via the logical addresses 431-434 provided by the access device 430, wherein the logical addresses 431-434 may be virtualized as an aggregate volume or set of aggregate volumes by the access device 430 to provide a layer of abstraction between the storage devices 411-414 and a system controller that uses a package according to an embodiment of the present invention. The aggregate volume or set of aggregate volumes are offered to a system controller via connections to the access device 430.

The access device 430 may be configured to aggregate the physical addresses 411-414 of the physical drives as a single drive wherein each subsequent drive provides additional storage capacity to the aggregated address. Alternatively, the access device 430 may be configured to aggregate the physical addresses 411-414 of the physical drives using a pass-through mechanism (see FIG. 5) to allow each SD in the package to be separately addressable.

Figure 5:
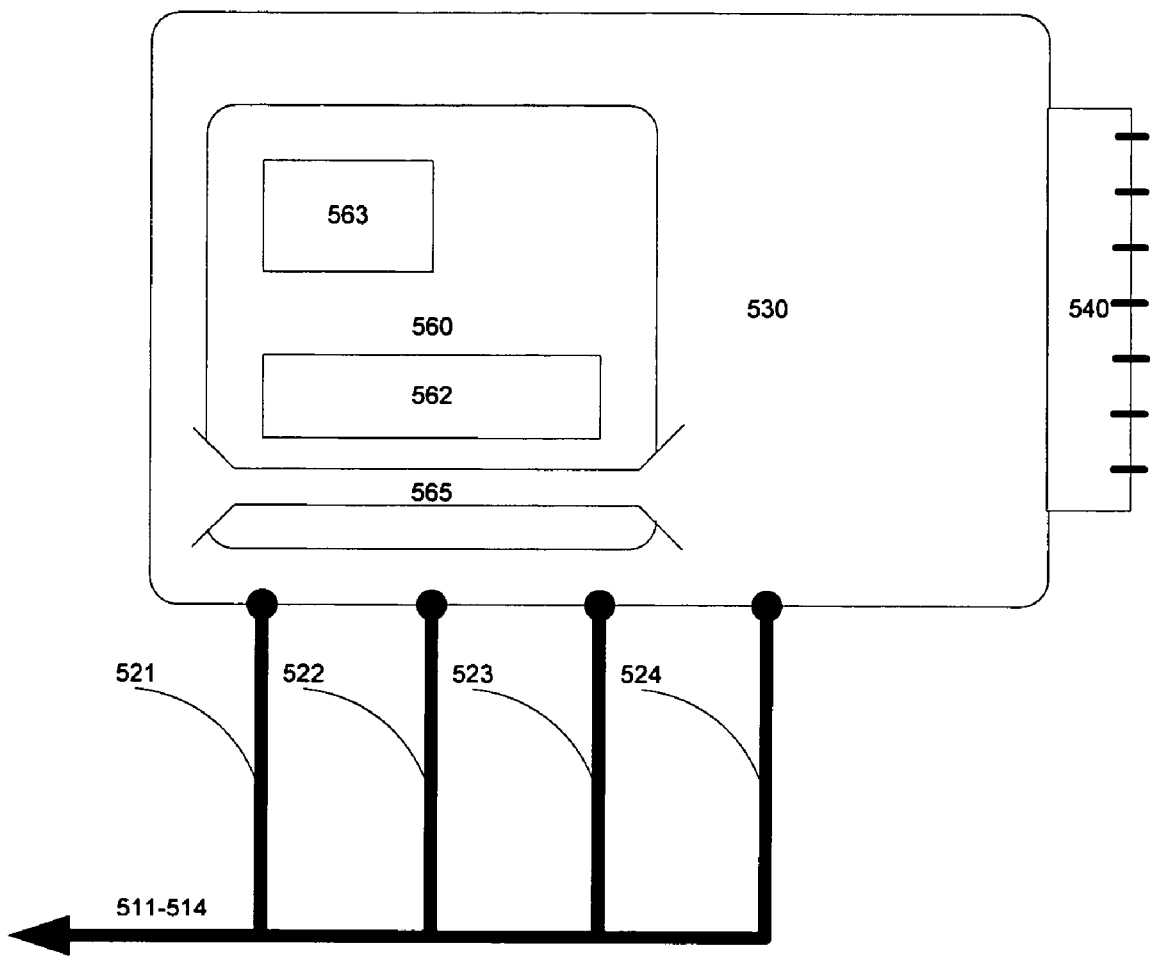
FIG. 5 illustrates an address aggregator incorporating a package controller in accordance with an embodiment of the present invention.

FIG. 5 illustrates an access device 530 in accordance with an embodiment of the present invention. In FIG. 5, access device 530 is physically connected to carrier housing SD connections 521-524 and incorporates package controller 560. Package controller 560, having processor 562 and memory 563, provides a RAID configuration for the package. A system controller (not shown) may also provide RAID over multiple packages. Thus, using the package controller 560, multiple levels of RAID may be implemented.

Access device 530 converts logical addresses into virtual addresses, thereby allowing the abstraction of the location of SDs 511-514. Access device 530 makes the abstracted virtual addresses available over connections via external connector 540. A further embodiment of the present invention provides an access device 530 that includes a pass-through mechanism 565 to allow each SD in the package to be separately addressable. Thus, in instances where the package controller 560 need not be part of a process, the pass-through mechanism 565 can mask the presence of package controller 560 allowing each SD to be addressed individually using logical addresses. Incorporating package controller 560 within the structure of address aggregator 530 reduces the total number of internal SD connections needed to connect SDs 511-514 to package devices. However, those skilled in the art will recognize that package controller 560 and access device 530 may be separate physical entities without departing from the scope of the present invention.

Figure 6:
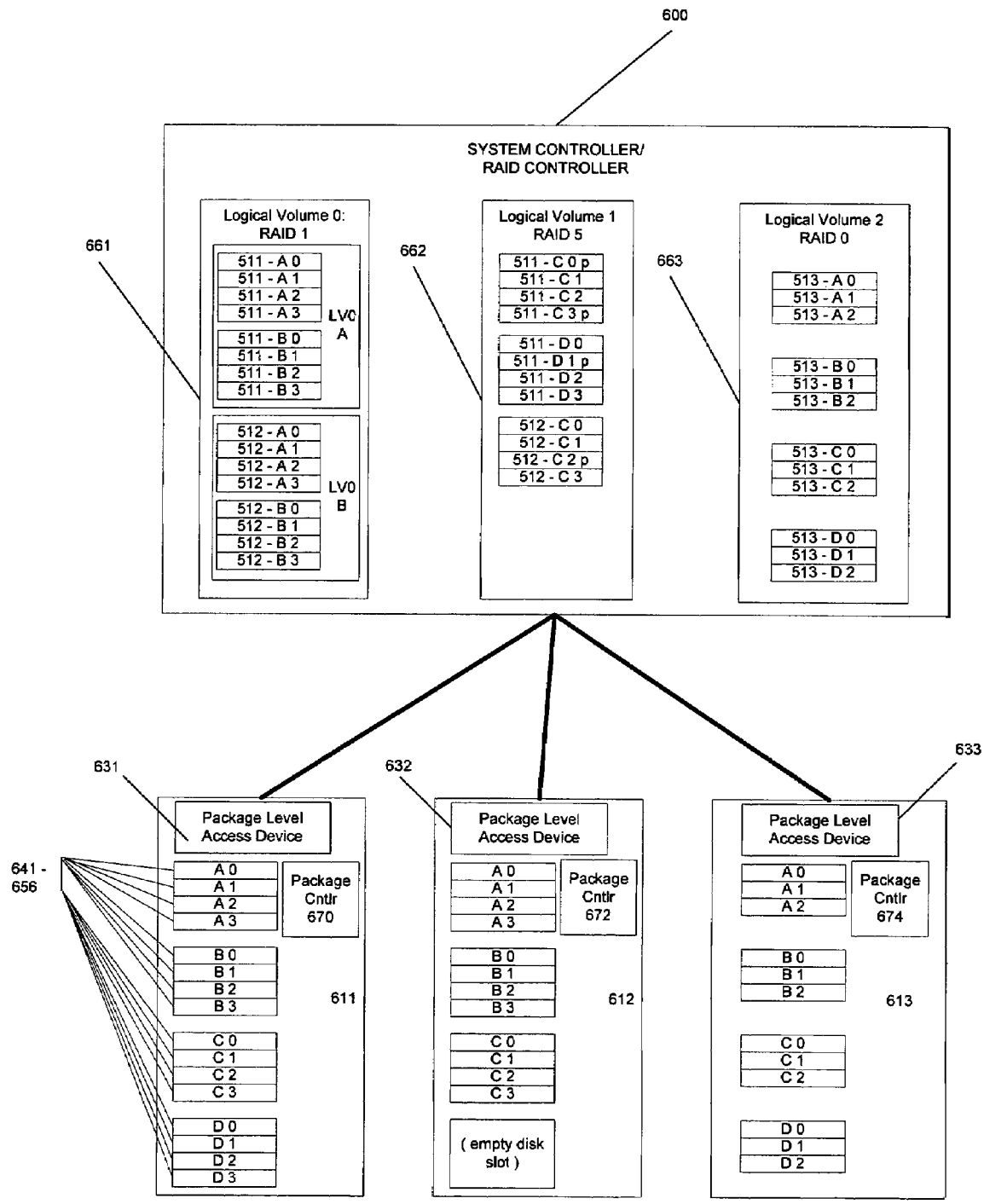
FIG. 6 illustrates a system having a desired system level RAID arrangement and package level RAID in accordance with an embodiment of the present invention.

FIG. 6 illustrates a system 600 having a desired system level RAID arrangement and package level RAID in accordance with an embodiment of the present invention. Each package 611-613 includes storage devices, A, B, C, and D, package level access devices 631-633 and package controllers 670, 672, 674.

Package 611 contains 4 drives, A, B, C, and D. As portrayed the address space of each is divided into 4 logical segments, 0, 1, 2, 3, by package controller 670 and 16 segments 641-656 are formed. Package 612 only has 3 disks, plus 1 empty slot, representing a partially populated package, and thus having a total of 12 segments. Package 613 has all 4 disks, but has only 3 segments per disk representing either different size disks held by the package or a different segmenting algorithm chosen by the package controller 674, and thus having a total of 12 segments.

Logical Volume 0 661 is a system level RAID 1 volume (mirrored pair) composed of 2 disks/8 segments from each of Packages 611 and 612, those of 611 forming volume A of the RAID 1 configuration, and those of 612 forming volume B of the RAID 1 configuration. Thus, the system controller 600 will present Logical Volume 0 661 as 8 segments in size. Of course the segment distinction is unnecessary for this particular example.

Logical Volume 1 662 is a system level RAID 5 volume composed of 3 disks, 2 from Package 611 and 1 from Package 612, using a total of 12 segments. Note that some segments have 'p' designations as they are parity segments. Thus, the system controller 600 will present Logical Volume 1 662 as 8 segments in size.

Logical Volume 2 663 is a system level RAID 0 volume (striped, no parity, mainly a performance enchancement) composed of the 4 disks from Package 613. Data would be written, following the RAID 0 convention, to all of the $0^{th}$ segments on each disk in series A-D, then to all of the $1^{th}$ segments, then to all of the 2th segments. Thus the system controller 600 will present Logical Volume 2 663 as 12 segments in size.

In FIG. 6, system level RAID controller 600 thus achieves a desired system level RAID arrangement using three packages 611-613. Package level RAID controllers 670-674 may also be provided to achieve package level RAID using multiple SDs within each package 611-613.

Figure 7:
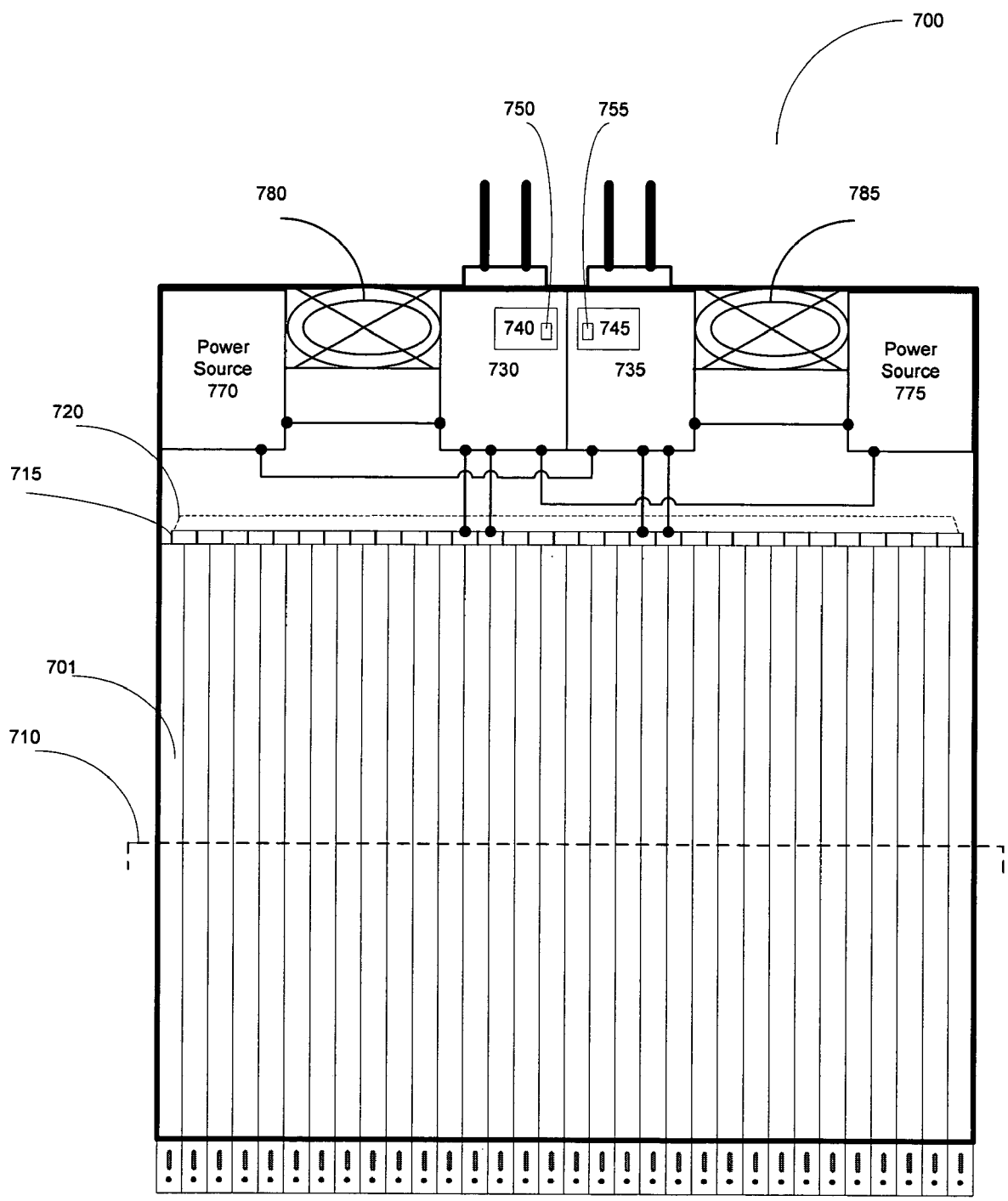
FIG. 7 illustrates a storage system housing fully assembled packages in accordance with an embodiment of the present invention.

FIG. 7 illustrates a storage system 700 housing fully assembled packages in accordance with an embodiment of the present invention. In FIG. 7, storage system 700 is shown housing 32 fully assembled packages 710. Packages having external connectors 715 engage with the storage system using package connectors 720. Several types of package connectors 720 may be used to connect a package 701 to storage system 700 including: serial advanced technology attachment (SATA) hard drive interconnects, SATA-2 interconnects, serial attached SCSI (SAS) technology, and arbitrated loop or switched Fibre Channel (FC). The advantages of using the above-mentioned connectors are the same as the advantages described for internal connectors used to connect the SDs to the address aggregator within the carrier housing.

Storage system 700 housing power sources 770 and 775, cooling fans 780 and 785, package aggregators 730 and 735, multiple packages 710 and package connectors 720. Storage system 700 communicates to the multiple packages 710 using package aggregators 730 and 735 coupled to the multiple packages using package connectors 720. Package aggregators 730 and 735 allow for high-density storage by connecting to each of the packages to provide power, signaling and system level controllers 740 and 745 configured for implementing a desired storage system configuration. System level controllers 740 and 745 may optionally be configured to control logical volume aggregation, and may further be configured to present a desired RAID configuration across the plurality of packages 710 by incorporating RAID controllers 750 and 755 in system level controllers 740 and 745, respectively. Thus, RAID controllers 750 and 755 may present a desired RAID configuration using a plurality of the packages 710. The previously described package level RAID controller (e.g., 670-674) and storage system level RAID controller (e.g., 740) allows the storage system 700 to provide multiple RAID levels.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A storage system, comprising:
a system controller within a controller housing, the system controller being configured for implementing a desired system level storage configuration;
a plurality of high density storage systems disposed within the system controller housing, each of the plurality of high density storage systems further comprising:
a housing configured for installation in a system controller housing, the housing further having a single connector configured for connecting to the system controller housing;
a plurality of storage devices, each of the plurality of storage devices arranged linearly within the housing from a front of the housing to a back of the housing to provide a high density storage system form factor having a width substantially corresponding to a dimension of one of the plurality of storage devices; and
a storage access device for aggregating storage capacity of the plurality of storage devices as a single storage device address to the system controller via the single connector and for providing access to each of the plurality of storage devices within the housing via the single connector; and
a package aggregator, coupled to the plurality of high density storage systems, for aggregating storage capacity of the plurality of the plurality of high density storage systems disposed within the system controller housing and for providing power, control and signaling to each of the plurality of high density storage systems via the single connector of each of the plurality of high density storage systems.

2. The storage system of claim 1, wherein the plurality of storage devices are arranged horizontally end-to-end.

3. The storage system of claim 1, wherein the plurality of storage devices are arranged vertically side-by-side.

4. The storage system of claim 1, wherein the width of the high density storage system substantially corresponds to a height of one of the plurality of storage devices.

5. The storage system of claim 1, wherein the width of the high density storage system substantially corresponds to a width of one of the plurality of storage devices.

6. The storage system of claim 1, wherein the system level controller is configured to provide logical volume aggregation across the plurality of high density storage systems.

7. The storage system of claim 1, wherein the system level controller presents a system level RAID configuration across the plurality of high density storage systems and the storage access device of each high density storage systems presents a storage configuration for the plurality of storage devices within each high density storage system.

8. A method for providing high density storage, comprising:
providing a system controller within a controller housing, the providing a system controller further comprising configuring the system controller for implementing a desired system level storage configuration;
providing a plurality of high density storage system housings, each of the plurality of high density storage system housings configured for installation in a system controller housing, the plurality of high density storage system housings further having a single connector configured for connecting to the system controller housing;
within each of the plurality of high density storage system housings, arranging a plurality of storage devices linearly from a front of the housing to a back of the housing to provide a high density storage system form factor for each of the plurality of high density storage system housings having a width substantially corresponding to a dimension of one of the plurality of storage devices;
aggregating storage capacity of the plurality of storage devices within each of the plurality of high density storage system housings as a single storage device address to the system controller via the single connector and providing access to each of the plurality of storage devices within each of the plurality of high density storage system housings via the single connector;
aggregating storage capacity of the plurality of high density storage system hosuings disposed within the system controller housing;
providing power, control and signaling to each of the plurality of high density storage system hosuings via the single connector of each of the plurality of high density storage system housings.

* * * * *